United States Patent
Cowley

(10) Patent No.: US 7,421,040 B2
(45) Date of Patent: Sep. 2, 2008

(54) MODEM TUNER

(75) Inventor: Nicholas Paul Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 1739 days.

(21) Appl. No.: 10/032,879

(22) Filed: Oct. 24, 2001

(65) Prior Publication Data

US 2002/0075950 A1    Jun. 20, 2002

(30) Foreign Application Priority Data

Oct. 25, 2000    (GB)    .................................. 0026213.9

(51) Int. Cl.
*H04L 27/00*    (2006.01)
*H04L 23/00*    (2006.01)
*H04N 5/46*    (2006.01)
*H04B 1/26*    (2006.01)

(52) U.S. Cl. ........................ 375/316; 375/377; 348/729; 455/324

(58) Field of Classification Search ................. 375/316, 375/377
See application file for complete search history.

(56) References Cited

U.S. PATENT DOCUMENTS

| 4,162,451 | A |   | 7/1979 | Ash |
|---|---|---|---|---|
| 4,162,452 | A |   | 7/1979 | Ash |
| 4,340,975 | A | * | 7/1982 | Onishi et al. ................ 455/315 |
| 2003/0133049 | A1 | * | 7/2003 | Cowley et al. .............. 348/731 |

FOREIGN PATENT DOCUMENTS

GB    2223900    4/1990

* cited by examiner

*Primary Examiner*—Tesfaldet Bocure
(74) *Attorney, Agent, or Firm*—Blakely, Sokoloff, Taylor & Zafman LLP

(57)    ABSTRACT

A tuner includes a mixer which receive first and second inputs via a multiplexer in different frequency ranges from different sources such as cable and satellite. A local oscillator supplies signals via a bandswitch which switches the local oscillator frequency range in synchronism with the selection of inputs by the multiplexer. The mixer converts the selected incoming data stream to zero or near-zero intermediate frequency and this signal is filtered exclusively by a variable bandwidth low-pass filter before being converted to the digital domain and demodulated.

8 Claims, 3 Drawing Sheets

MODEM TUNER

FIELD OF THE INVENTION

The present invention relates to a modem tuner. Such a tuner may be used for multi-mode modem applications, for example including cable systems, multi-point multi-channel distribution systems (MMDS) and local multi-point distribution service (LMDS).

BACKGROUND

Known types of modem tuners are based closely on cable standards, for example in terms of channel spacing, data rates and modulation schemes. FIG. 1 of the accompanying drawings illustrates a typical known modem tuner of the single conversion type for receiving signals selectively from a satellite aerial 1 or a cable input 2. The satellite aerial is connected to a low noise block (LNB) 3, which receives signals, for example, in a band between 3 GHz and 22 GHz The LNB 3 comprises a frequency changer which converts these frequencies into the L band between 900 MHz and 2.2 GHz. Those signals are supplied to an in-door unit (IDU) 4, which converts the signals to be same frequency band as used by a cable distribution system to which the cable input 2 is connected, for example 50 to 900 MHz. The output of the IDU 4 and the cable input 2 are connected to respective inputs of a multiplexer (MUX) 5, which selects which of the signal sources is connected to the input of a tuner 6.

The tuner input is connected to a tracking filter and automatic go control (AGC) circuit 7. The output of the circuit 7 is connected to the signal input of a mixer 8, which receives a local oscillator signal from a local oscillator 9 controlled by a phase locked loop (PLL) synthesiser 10. The tuner 6 is of the single conversion type and the mixer 8 converts the selected channel, which may typically have a bandwidth of 8 MHz, so that it is centred on the intermediate frequency, which is typically 44 MHz. The intermediate frequency signal is supplied via a buffer 11 to a surface acoustic wave (SAW) intermediate frequency bandpass filter 12 which, for the example mentioned above, has a passband of 8 MHz centred on a centre frequency of 44 MHz. The output of the filter 12 is supplied via a buffer 13 to a circuit 14, which performs analogue/digital conversion, demodulation and forward error correction.

FIG. 2 of the accompanying drawings illustrates an alternative type of tuner of the double conversion type. Like reference numerals refer to like parts in FIGS. 1 and 2 and such like parts will not be described again.

The tuner 6 of FIG. 2 comprises an input AGC stage 15 whose output is connected to a first frequency changer comprising a mixer 8a connected to a local oscillator 9a controlled by a PLL synthesiser 10a. The first frequency changer converts the incoming signal selected by the multiplexer 5 to a relatively high intermediate frequency, for example 1.2 GHz. This is filtered by a high intermediate frequency (IF) bandpass filter 16 and supplied to a second frequency changer comprising a mixer 8b connected to a local oscillator 9b controlled by a PLL synthesiser 10b. The second frequency changer converts the high IF signal to a second low intermediate frequency which is typically 44 MHz. The second IF signal is then buffered and filtered before being supplied to the circuit 14 for conversion to and processing in the digital domain.

Known arrangements of the type shown in FIGS. 1 and 2 suffer from various disadvantages. For example, because the signals from the satellite aerial 1 are converted to the same frequency range as the signals from the cable distribution system, interactions may occur between signals from the two sources. For example, if the tuner 6 is set to receive a desired channel from one of the sources and a channel at the same frequency is present from the other source, interactions may occur between the two data streams carried by the signals so that the desired data stream suffers interference.

There are proposed new standards for transmission systems which require that channel bandwidths be variable and increased. Also, different data rates and types of modulation are being proposed in such standards. Existing data rates are typically in the range of 100 kbyte/sec to 45 Mbyte/sec and there are presently proposals for data rates up to 200 Mbytes/sec. Modem tuners of the type shown in FIGS. 1 and 2 are not well-suited to meeting the requirements of the proposed new standards.

For example, higher image rejection in front of or within the mixer 8 or 8a will be required because, with wider channels, the wanted and image channels will be closer together. Also, the bandwidths of the tracking filter of the stage 7 or of the high IF filter 16 will need to be wider in order to cope with the wider channel bandwidths. This makes the image rejection problem worse and also allows more potentially interfering signals to be passed in the case where lower bandwidth channels are to be received. Thus, the potential for intermodulation distortion is increased. Providing bandpass filters of variable bandwidth for the filters 12 and 16 causes substantial problems and is impractical for tracking filters in the circuit 7 of the tuner shown in FIG. 1. Thus, tuners of the type shown in FIGS. 1 and 2 are unlikely to provide satisfactory performance for the proposed new standards, GB 2 223 900 discloses a television tuner for reception of signals broadcast by satellite. The tuner has an input switch for selecting between signals having two orthogonal linear polarisations and in different frequency ranges. There is an image-tracking filter ahead of the mixer, which performs up-conversion to a high intermediate frequency. The local oscillator incorporates band-switching for receiving different frequency ranges.

U.S. Pat. Nos. 4,162,451 and 4,162,452 disclose a dual-standard television receiver for receiving channels in the UHF band and the VHF bands. Radio frequency switching is provided for selecting between high and low VHF bands. Separate front ends are provided for VHF and UHF reception in some of the disclosed examples. In one of the disclosed examples, switching between VHF and UHF bands is performed upstream of a common mixer, which is provided with two voltage-controlled oscillators for covering the different frequency ranges.

SUMMARY OF THE INVENTION

According to the invention, there is provided a modem tuner of one of zero intermediate frequency type and near-zero intermediate frequency type for receiving signals modulated with digital data, comprising: a first input for signals in a first frequency range $f_1$ to $f_2$; a second input for signals in a second frequency range $f_3$ and $f_4$, where $f_1 > f_2 > f_3 > f_4$; a mixer selectively connectable to one of said first and second inputs; a local oscillator having band switching for supplying to said mixer a local oscillator signal in any selected one of a plurality of local oscillator frequency ranges; and channel selective filtering located exclusively downstream of said mixer.

A first input frequency range may be substantially within a first band from 50 to 900 MHz.

A second input frequency range may be substantially within a second band from 900 MHz to 2.2 GHz.

The number of input frequency ranges may be equal to the number of local oscillator frequency ranges. The mixer may have a signal input connected to a multiplexer for selectively connecting the signal input to any one of a plurality of timer inputs. Each of the timer inputs may be connected to the multiplexer via a respective buffer.

The mixer and the local oscillator may comprise a zero intermediate frequency frequency changer. The tuner may comprise a variable bandwidth filter for filtering a signal from the mixer. The filter may be a low-pass filter.

The mixer may have in-phase and quadrature outputs.

The present invention and various of its embodiments thus overcome or reduce many of the disadvantages of known modem tuners. For example, data streams from different sources are isolated in the frequency domain so that there is no or much reduced possibility of cross-contamination and interference.

It is possible to provide a tuner which is compatible with wired and wireless systems and with proposed extensions in flexible channel bandwidths and modulation schemes. Thus, it is easier to provide a universal modem arrangement.

It is possible to avoid the need for external IF gain stages and AGC circuits so as to provide a simpler arrangement. Supplying signals to the demodulator at baseband reduces the performance requirements on analogue/digital conversion. For example, the analogue bandwidth may be reduced to one tenth of that in known arrangements.

The use of zero intermediate frequency techniques means that there are no image frequencies to be taken into account. Also, the tuner may be simplified by not requiring any tracking components and by providing only one frequency conversion stage.

BRIEF DESCRIPTION OF THE DRAWINGS

The invention will be further described, by way of example, with reference to the accompanying drawings, in which.

Like reference numerals refer to like parts throughout the drawings and those parts which have been described hereinbefore will not be described further.

DESCRIPTION OF THE PREFERRED EMBODIMENT

Figure 1:
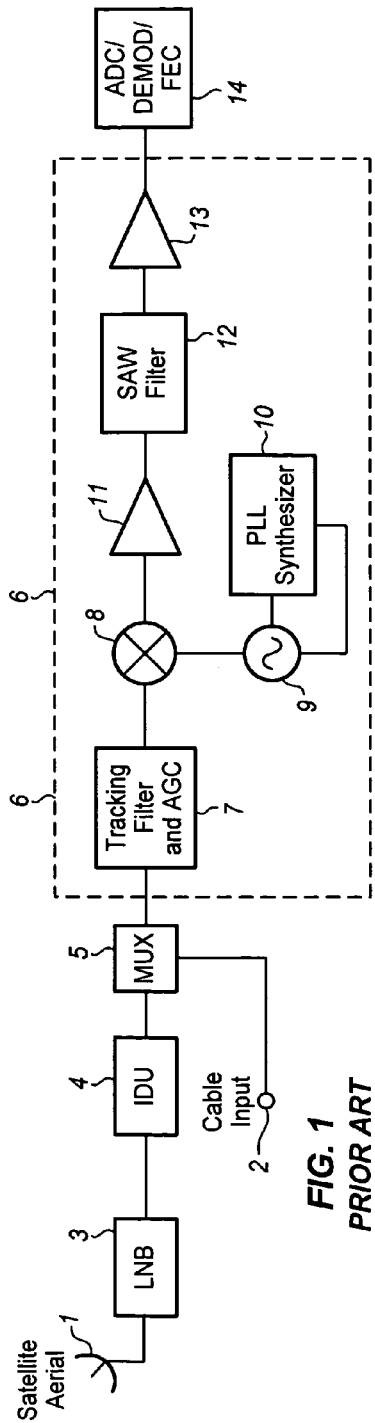
FIG. 1 is a block circuit diagram of a first known type of modem tuner.
Figure 2:
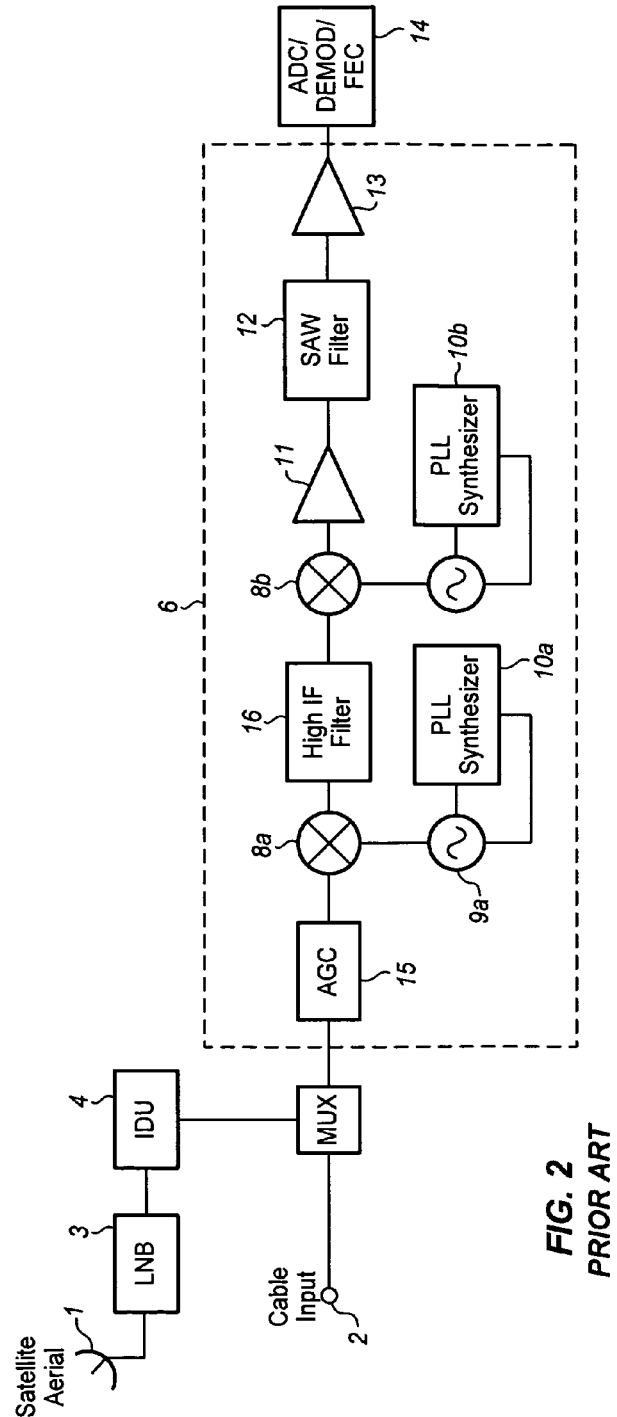
FIG. 2 is a block circuit diagram of a second known type of modem tuner.
Figure 3:
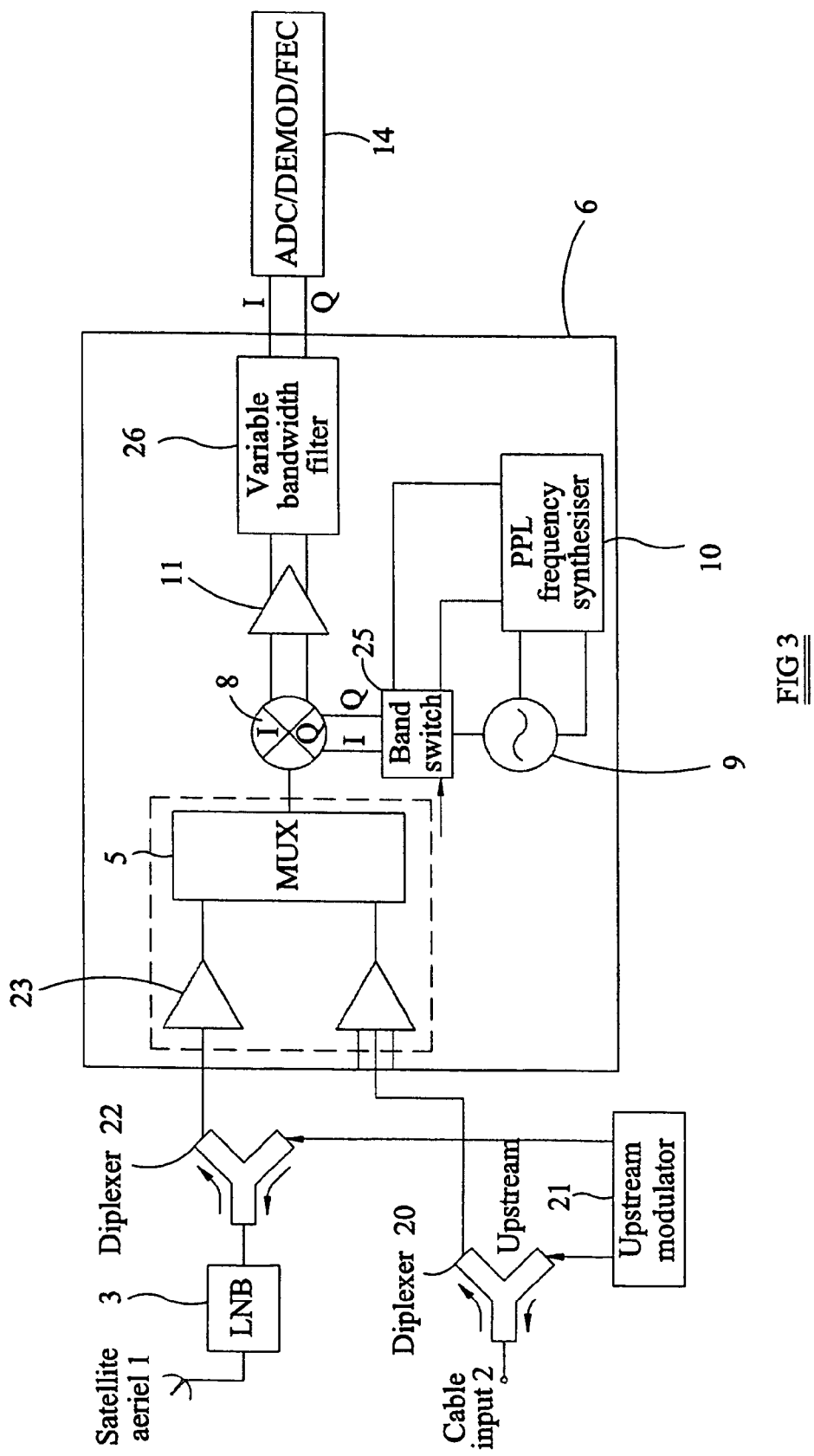
FIG. 3 is a block circuit diagram of a modem tuner constituting an embodiment of the present invention.

The modem tuner shown in FIG. 3 comprises a cable input 2 connected to a diplexer 20 which is connected to a first input of the tuner 6 and to an upstream modulator 21. The modulator 21 may, for example, be embodied by the same hardware as the circuit 14 and supplies signals via the diplexer 20 to the cable input 2 for distribution via a cable distribution system.

The satellite aerial is connected to an LNB 3, which converts the incoming signal to the L band and supplies this via a diplexer 22 to a second input of the receiver 6. The diplexer 22 also receives signals from the modulator 21 for distribution.

The inputs of the tuner 6 are connected to respective buffers 23 and 24 whose outputs are connected to a multiplexer 5. The output of the multiplexer 5 is connected to a mixer 8 which converts the incoming signals to zero intermediate frequency in-phase (I) and quadrature (Q) signal paths. A local oscillator 9 controlled by a PLL synthesiser 10 is connected to the mixer 8 via a bandswitch 25, which supplies in-phase and quadrature local oscillator signals to the mixer 8. The outputs of the mixer 8 are supplied via buffering 11 to a variable bandwidth low-pass filter 26, whose outputs are supplied to the circuit 14 for analogue/digital conversion, demodulation and forward error correction.

Each input of the tuner 6 receives signals in a different frequency range. For example, signals from the cable input are typically in a frequency band between 50 and 900 MHz. The frequency-converted signals from the LNB 3 are in the L band 900 MHz to 2.2 GHz. Thus, by ensuring that the different input signal sources are in different frequency ranges, the possibility of interference between signals at the different inputs is eliminated or substantially reduced.

The individual input signals are independently buffered by the buffers 23 and 24 before being selected by the multiplexer 5. The filter 26 is embodied as a low-pass filter whose bandwidth can therefore easily be varied in order to cope with different channel widths for data streams. By converting the input signals to zero intermediate frequency, image problems are substantially avoided and the requirements of the analogue/digital conversion in the circuit 14 are greatly reduced by performing the conversion at baseband.

Figure 4:
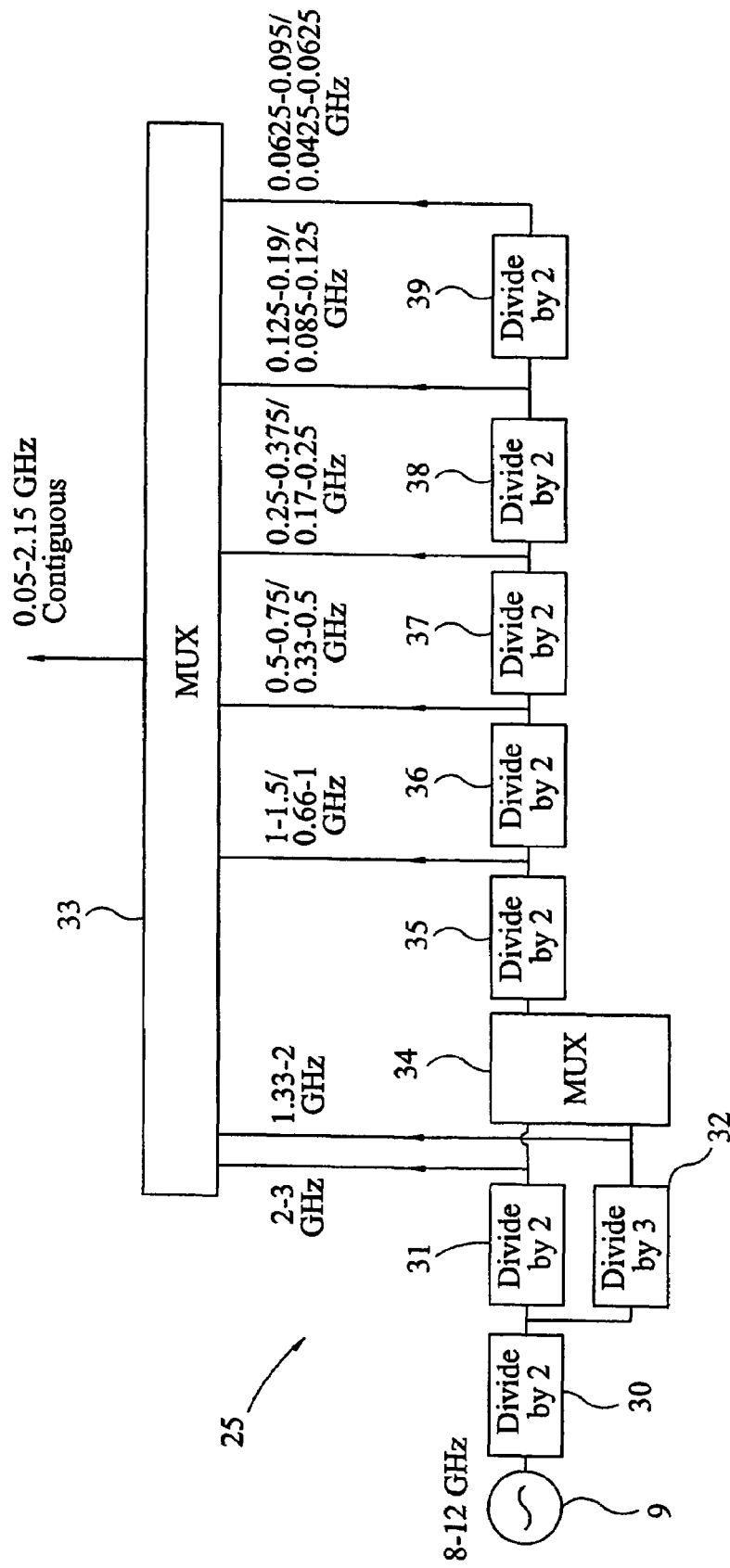
FIG. 4 is a block circuit diagram of an oscillator bandswitching arrangement of the tuner of FIG. 3.

The bandswitch 25 is shown in more detail in FIG. 4 and comprises a divide by two circuit 30 which divides the local oscillator signal (having a frequency of between 8 and 12 GHz) by two. The output of the circuit 30 is supplied to a further divide by two circuit 31 and to a divide by 3 circuit 32, both of whose outputs are connected to respective inputs of a multiplexer (MUX) 33. Although single connections am shown, these are all duplicated to provide the quadrature signals to the mixer 8. The outputs of the circuits 31 and 32 are also supplied to respective inputs of a further multiplexer 34, whose output is connected to a chain of further divide by two circuits 35 to 39, each of whose outputs is connected to a respective input of the multiplexer 33.

The frequency ranges of the signals at the inputs of the multiplexer 33 are indicated in FIG. 4. There are two frequency ranges at the outputs of each of the divide by two circuits 35 to 39 depending on whether the multiplexer 34 selects the output of the divide by two circuit 31 or the output of the divide by three circuit 32. The bandswitching arrangement is thus capable of supplying quadrature signals with a frequency range of 0.05 to 2.15 GHz without any gaps in frequency coverage and using a local oscillator tuning range of 8 to 12 GHz.

It is thus possible to provide a modem tuner of improved performance and reduced complexity and cost. Such a tuner is capable of receiving data streams of different standards, such as different channel bandwidths and different bit rates, from any of a variety of sources such as cable distribution system, MMDS and LMDS. Tracking components can be eliminated and non-zero intermediate frequency bandwidth problems can be avoided.

What is claimed is:

1. A modem tuner of one of zero intermediate frequency type and near-zero intermediate frequency type for receiving signals modulated with digital data, comprising:
   a first input for signals in a first frequency range $f_1$ to $f_2$;
   a second input for signals in a second frequency range $f_3$ and $f_4$, where $f_1 > f_2 > f_3 > f_4$;

a mixer selectively connectable to one of said first and second inputs;

a multiplexer selectively connecting between one of said first and second inputs;

first and second buffers connected between said first and second inputs and said multiplexer;

a local oscillator having band switching for supplying to said mixer a local oscillator signal in any selected one of a plurality of local oscillator frequency ranges; and channel selective filtering located exclusively downstream of said mixer.

2. A tuner as claimed in claim 1, in which said channel selective filtering has a variable bandwidth.

3. A tuner as claimed in claim 1, in which said channel selective filtering comprises low pass filtering.

4. A tuner as claimed in claim 1, in which said first frequency range is substantially within a first band from 50 to 900 MHz.

5. A tuner as claimed in claim 1, in which said second frequency ranges is substantially within a second band from 900 MHz to 2.2 GHz.

6. A tuner as claimed in claim 1, in which said local oscillator frequency ranges comprise first and second local oscillator frequency ranges.

7. A tuner as claimed in claim 1, in which said mixer has in-phase and quadrature outputs.

8. A zero intermediate frequency type modem tuner for receiving signals modulated with digital data comprising:

a first input for signals in a first frequency range from about 50 MHz to 900 MHz;

a second input for signals in a second frequency range from about 900 MHz to 2.2 GHz;

a mixer having a signal input and in-phase and quadrature outputs;

a multiplexer connected to said first and said second inputs and selectively connecting said signal input of the mixer to any one of said first and second inputs;

a first buffer connected between said first input and said multiplexer;

a second buffer connected between said second input and said multiplexer;

a local oscillator for supplying to said mixer a local oscillator signal in any selected one of a plurality of local oscillator frequency ranges via a bandswitch; and a channel selective filter located downstream of said mixer, the channel selective filter being a variable bandwidth, low pass filter.

* * * * *